H. J. MARX.
MEASURING AND INDICATING DEVICE.
APPLICATION FILED FEB. 1, 1908.
922,931.
Patented May 25, 1909.
4 SHEETS—SHEET 2.
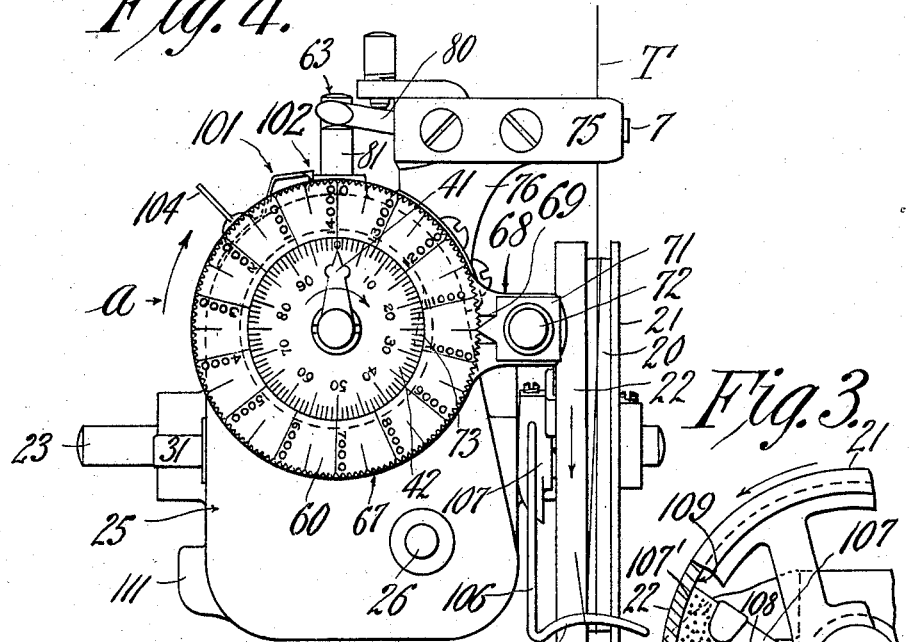
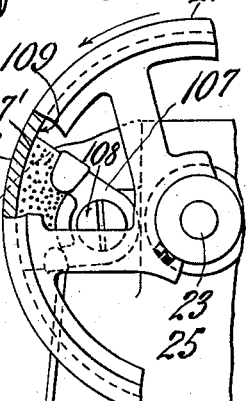
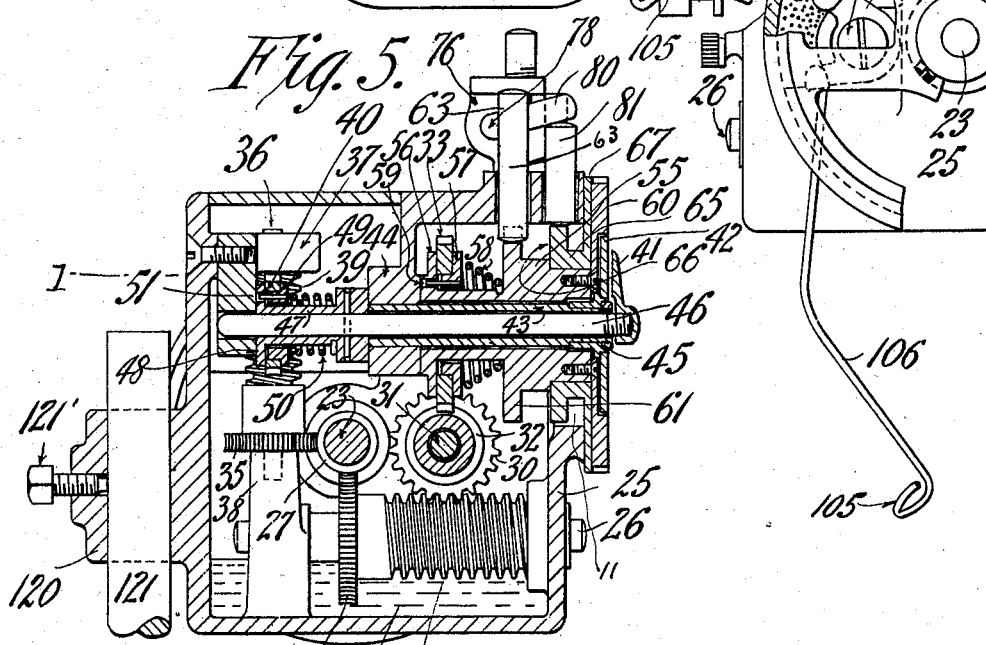
Witnesses:
H. L. Sprague
R. M. Mowry
Inventor:
Henry J. Marx,
by Wm. H. Bellona
Attorney.

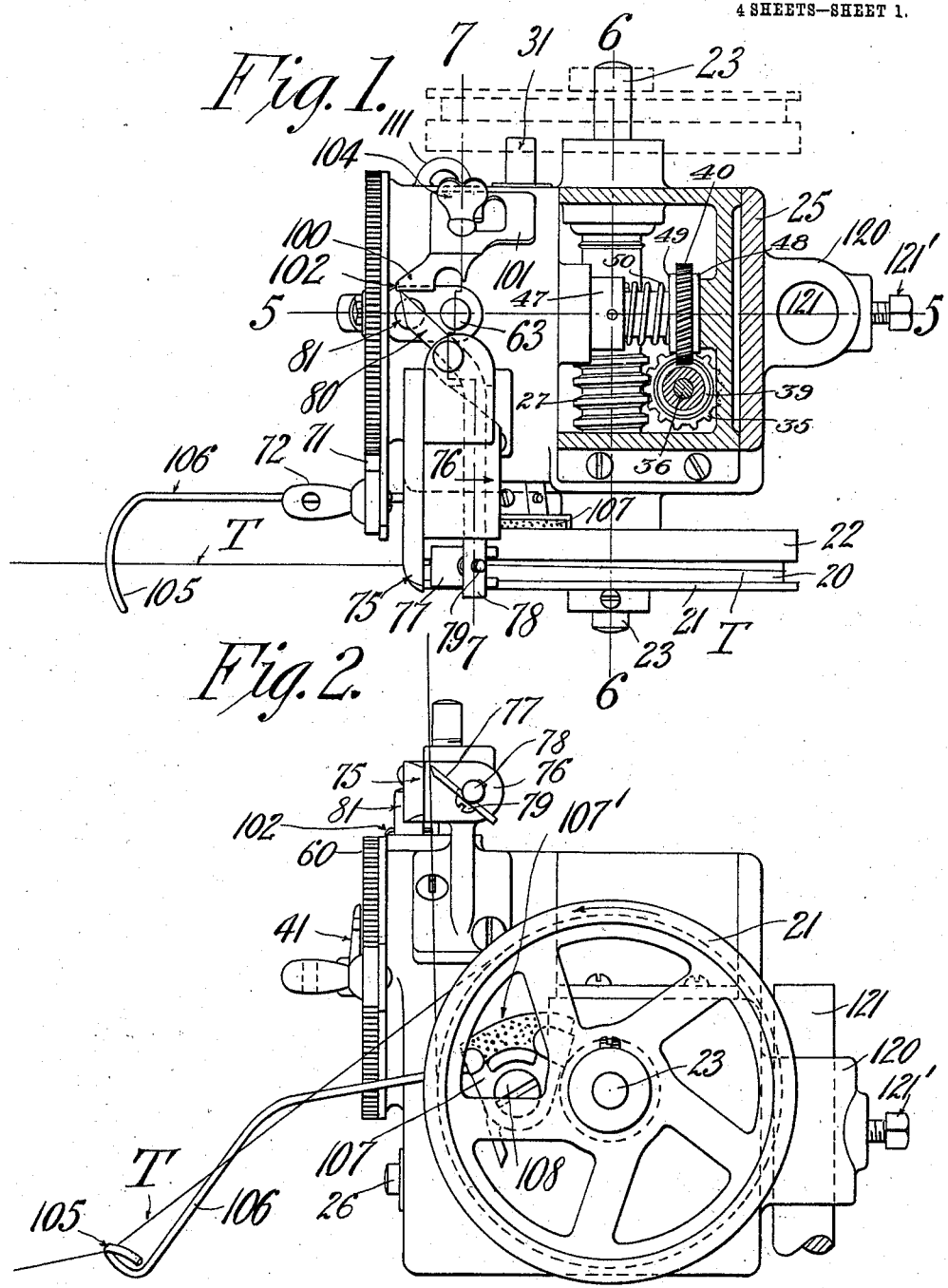

H. J. MARX.
MEASURING AND INDICATING DEVICE.
APPLICATION FILED FEB. 1, 1908.
922,931.
Patented May 25, 1909.
4 SHEETS—SHEET 3.
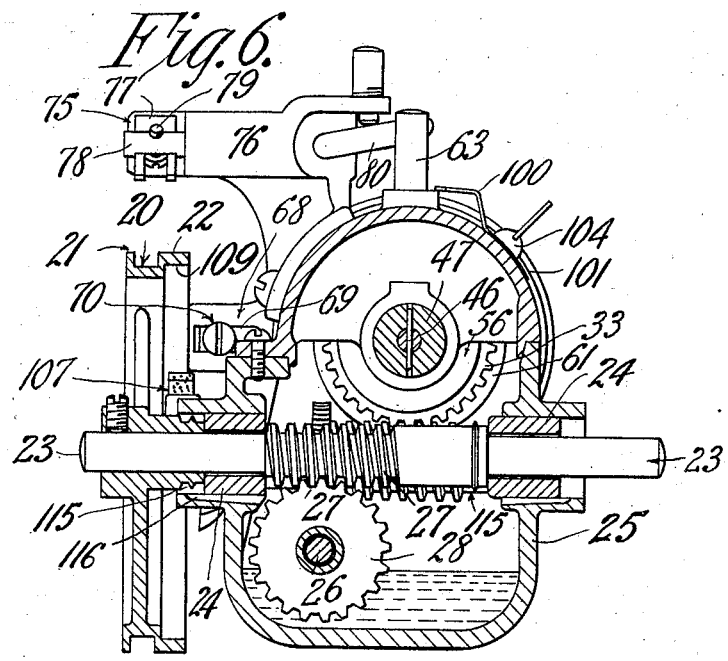
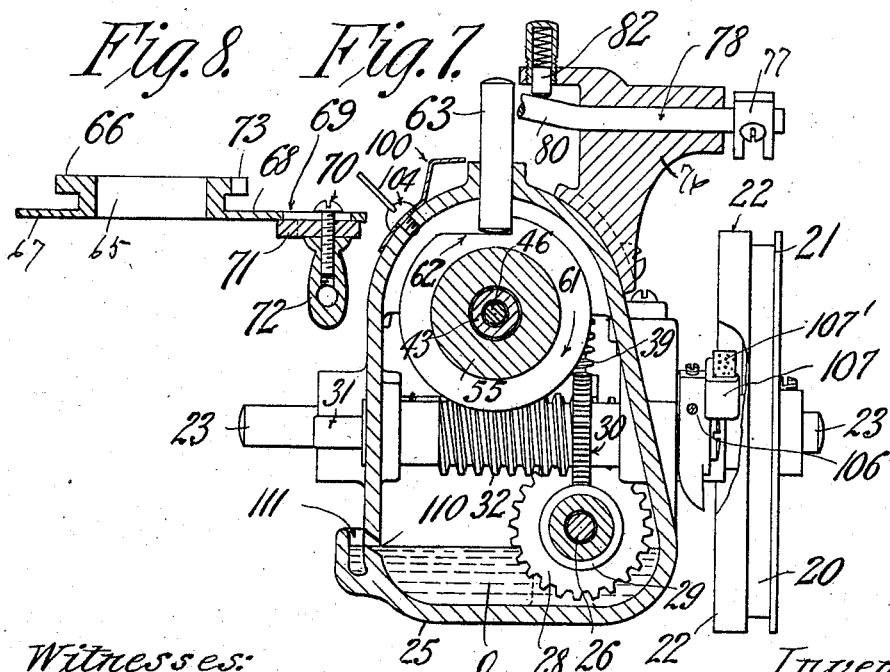
Witnesses:
H. L. Sprague
P. M. Mowry
Inventor;
Henry J. Marx,
by Wm. S. Bellows
Attorney.

H. J. MARX.
MEASURING AND INDICATING DEVICE.
APPLICATION FILED FEB. 1, 1908.
922,931.
Patented May 25, 1909.
4 SHEETS—SHEET 4.
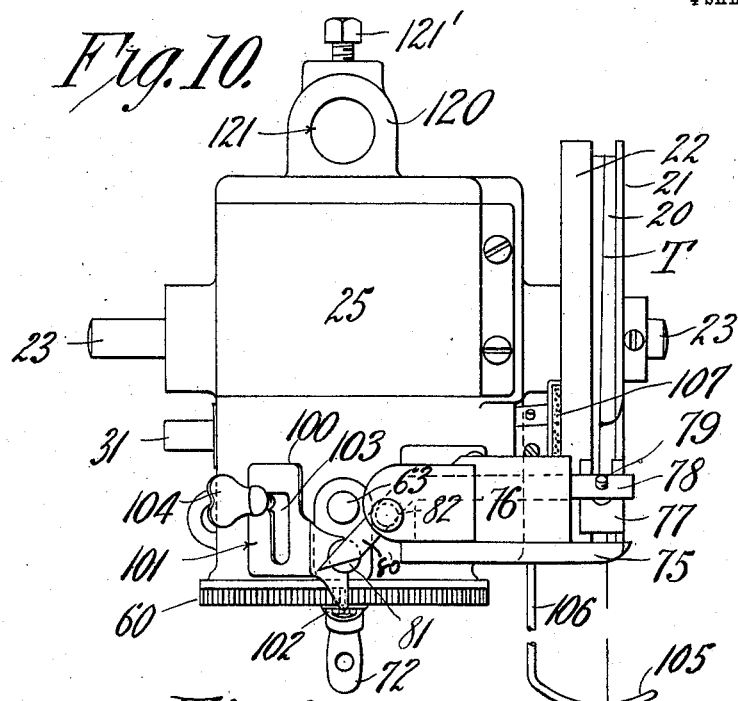
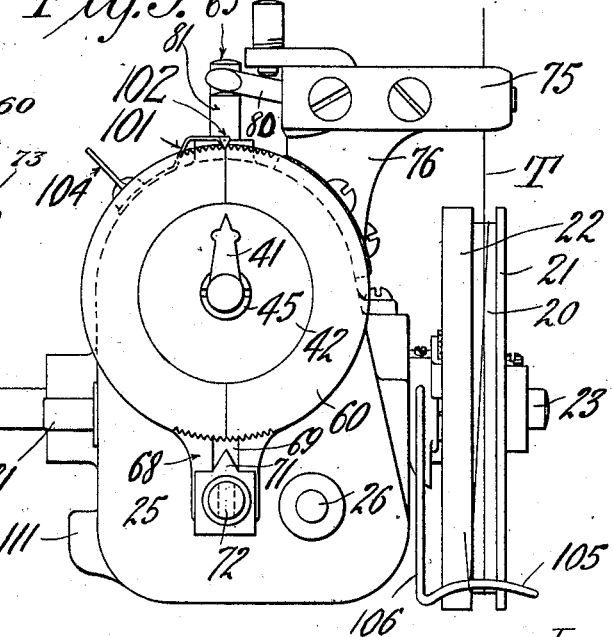
Witnesses:
H. L. Sprague
R. M. Mowry
Inventor:
Henry J. Marx,
by W. H. Bellows,
Attorney

UNITED STATES PATENT OFFICE.

HENRY J. MARX, OF HOLYOKE, MASSACHUSETTS.

MEASURING AND INDICATING DEVICE.

No. 922,931.     Specification of Letters Patent.     Patented May 25, 1909.

Application filed February 1, 1908. Serial No. 413,813.

*To all whom it may concern:*

Be it known that I, HENRY J. MARX, a citizen of the United States of America, and resident of Holyoke, in the county of Hampden and State of Massachusetts, have invented certain new and useful Improvements in Measuring and Indicating Devices, of which the following is a full, clear, and exact description.

This invention relates to measuring and indicating devices, and more especially to that class thereof which are generally used for determining the lengths of different materials which are to be wound on spools or similar elements; and it has for one of its objects the provision of a mechanism whereby the length of the material to be measured and wound upon a spool can be accurately determined and cut off as soon as such predetermined length has been reached.

My invention has, furthermore, for its object the organization of a mechanism of this character which may also be utilized to determine the amount of material which can be wound upon a spool of any predetermined size.

My invention has, furthermore, for its object the provision of means whereby the registering elements may be set to correspond with different requirements, these elements being frictionally driven so that the operator may be enabled to set the mechanism to any desired figures.

My invention has, furthermore, for its object the combination with the rotatable drum which is operated by the material as it is pulled along by the winding mechanism, of a cutting device which is automatically thrown into engagement with the material and severs the latter at the completion of a certain number of rotations of the drum.

A further object of the invention resides in the combination, with the operating drum of the device, of a brake mechanism whereby the movement of said drum will be instantly checked or arrested upon the breakage of the material to be measured.

My invention has, furthermore, for its object the provision of a mechanism of this character, the operating parts of which are inclosed within a casing which is adapted to hold a quantity of lubricating oil and which at the same time is so constructed as to prevent leakage or the spreading of the oil beyond the confines of the casing.

My invention has, also, for its object the construction of the casing (which contains the several elements of the device) in such a manner as to adapt the same for use either right-handed or left-handed, as occasion may demand and without requiring any changes in the interior mechanism while only the substitution of a single outer bracket for another will be required to change the device from a right handed to a left handed one, or vice versa.

Other objects of the invention will hereinafter appear and the attainment thereof will be pointed out in the claims.

My invention has been fully illustrated in the accompanying drawings in which similar characters denote similar parts, and in which,—

Figure 1 is a top view of my improved mechanism, showing the cover and casing in section on line 1 of Fig. 5. Fig. 2 is a side view thereof, the material to be measured being represented as a thread, the tension of which retains the brake in its non-operative position; Fig. 3 is a fractional view corresponding to Fig. 2, and represents the brake in operation, and in the position which it will occupy when the thread is broken; Fig. 4 is a front view of my improved measuring device; Fig. 5 shows a longitudinal vertical section on line 5—5, Fig. 1; Fig. 6 is a cross section on line 6—6, of Fig. 1; Fig. 7 is a similar view taken on line 7—7, of Fig. 1; Fig. 8 illustrates, *per se*, one of the elements which are to be set by hand according to the amount of material to be measured; Fig. 9 is a front view, illustrating one of the hand-set devices disconnected from the mechanism which normally drives it, and Fig. 10 is a top view of the device corresponding to Fig. 9. Fig. 11 is a sectional detail view of the cutter cam, on line 11 of Fig. 5.

While my improved mechanism may be used for the purpose of measuring and indicating the lengths of different materials, it is especially designed for use in connection with thread to be wound upon spools of certain capacities, the thread being in the present instance looped around a drum, the circumference of which is equal to a certain fraction or part of a yard, the present drum being of such size that each rotation thereof corresponds to the travel of one-fourth of a yard of thread, so that in other words, four rotations of the drum will reel one yard of thread.

Briefly stated, the measuring drum actuates in the present case a pointer which is mounted for revolution and coöperates with a stationary disk which is preferably graduated into one hundred divisions, each division representing one yard, so that consequently for each four hundred rotations of the drum, the pointer will make one complete revolution relative to the disk. The drum also rotates a secondary indicating disk or dial which in the present instance is divided into fourteen principal sections, each having ten notches, the disk being constantly driven by the rotation of the drum, but in such a manner that for each complete revolution of the pointer, the index disk will be advanced only one notch, so that consequently the device illustrated in the accompanying drawings is capable of registering fourteen thousand yards.

Referring to the drawings, 20 denotes a drum the circumference of which equals in the present instance one-fourth of a yard, and which has the flanges 21, 22, between which the thread to be measured is retained, the latter being wound around the drum once so as to get a bite for rotating the same. The drum is mounted upon the shaft 23 journaled in bearings 24 Fig. 6 of a casing 25, in which the several elements of the mechanism are mounted. Rotary movement is imparted from the shaft 23 to a worm spindle 26 Figs. 5 and 6 through the intervention of a worm 27 carried on the shaft 23, and a worm gear 28 rigidly secured upon the spindle 26.

The worm spindle 26 is provided with a worm 29 Fig. 5 in engagement with a worm gear 30 which is carried by a transverse spindle 31 having a worm 32 Fig. 7 in engagement with a worm gear 33 Figs. 5 and 6 which is formed in the shape of an annular disk, both sides of which are frictionally engaged in a manner to be hereinafter described, and for actuating the indexing devices above referred to, the mechanism being of such proportion that it will require 56,000 rotations of the thread drum (each representing one-quarter of a yard) to turn the secondary index disk for 360 degrees or one full rotation. The worm 27 on the shaft 23 is also in engagement with a gear 35 Fig. 5 mounted upon a vertically-disposed spindle 36 which is journaled in bearings 37, 38, and carries a worm 39 in engagement with a worm gear 40 consisting substantially of a ring adapted frictionally to drive a pointer 41, the organization in the present instance being such that 400 rotations of the thread drum will be required to revolve the pointer 41 once around and past a series of division marks on a stationary dial 42 carried by the casing. This dial 42 is secured to the front end of a sleeve 43 rigidly held in lug 44 on the casing, and by a nut 45 in screw-engagement with the front end of sleeve (see Fig. 5).

The pointer 41 is carried at the front end of a spindle 46 journaled in the sleeve 43 and also in a bearing depending from the bearing 37 above mentioned, and said spindle 46 carries a fixed collar 47 provided at its rear end with a flange 48 which is adapted frictionally to engage one face of the worm gear 40 above described. The other side of this worm gear 40 is engaged by a friction collar 49 Fig. 5 which is adapted for longitudinal movement on the collar 47 and is forced toward the flange 48 by a spring 50, both the flange 48 and friction collar 49 being connected for simultaneous rotation with each other by a pin 51.

From the foregoing it will be understood that the spindle 46 with the collar 47 can be turned by hand relatively to the annular worm gear 40, while on the other hand the spindle 46 with the pointer 41 is frictionally driven by the rotation of the thread drum 20 to indicate the number of yards of thread which pass over said drum, and, as indicated by the divisions on the stationary dial 42.

In order to facilitate the count of a greater number of yards of thread, and also for the purpose of limiting the amount of thread (which in the present instance may be up to 14,000 yards), the secondary measuring ring or dial is operated from the drum at a very much reduced ratio, the worm gear 33 Fig. 5 forming a part of this mechanism and driving in a frictional manner a sleeve 55 mounted for rotation on the stationary sleeve 43 and having a flange 56 and a slip collar 57 between which the gear 33 is frictionally clamped by a spring 58.

Both the flange 56 and slip collar 57 are coöperatively connected for rotation by a pin 59.

At its forward end the sleeve 55 carries the secondary dial 60 which, as has above been stated, has its periphery divided into fourteen principal sections, each section again being subdivided into ten parts, and each of these parts representing one full revolution of the index pointer 41. The sleeve 55 is also provided with a cam-plate 61 Fig. 7 provided with a notch 62 to receive, or permit the descent of, a pin 63 mounted for vertical movement in the casing and serving as a means for gaging the starting position of the secondary dial for any predetermined number of yards to be measured, and also so that when the required number of yards has been measured, the thread will be cut off, and further rotation of the drum may then be prevented by a brake-mechanism to be hereinafter described.

As above stated, my present invention comprises a mechanism for cutting off the thread after a certain number of yards have been measured off, and in the present instance the action of the cutting mechanism is controlled directly by the movement of the secondary dial, the organization of the two devices, however, being such as to permit the device to be set for different lengths of thread to be measured before cutting off.

Referring to Figs. 5 and 8, it will be noticed that the sleeve 55 carries near its front end a shell 65 provided at its rear end with a cam disk 66, and having at its front end a flange 67 provided with a radial extension 68 (see Figs. 4 and 8), which is slotted at 69 to receive a screw 70 on which a detent 71 may be held by a thumb nut 72, the slot permitting the detent 71 to be moved toward the center of the sleeve 65, to engage any one of a series of notches cut on the periphery of the secondary dial in accordance with the subdivisions thereof.

The cam 66 is provided with a notch 73 (see Fig. 11) to permit the operation of the cutting mechanism, which in the present instance comprises a stationary plate or anvil 75 secured to a bracket 76 which is attached to the casing 25.

Coöperative with the stationary plate or anvil 75, is a movable cutter blade 77 which is attached to a cutter spindle 78 by means of a screw 79, Figs. 2, 6 and 7 said spindle being journaled in the bracket 76 and having at its forward end an arm 80 normally resting upon the top of a vertically movable actuator or pin 81, the lower end of which is adapted to ride on the disk 66 and is held in contact therewith by a spring-actuated plunger 82, see Fig. 7.

In the present case, the drawings illustrate the machine set to measure off 10,500 yards of material and to cut off the same from the supply on the instant when this quantity has been measured off. Furthermore, the position of the device as a whole is exactly on the starting line; or, in other words, the device is just ready to commence the operation of counting. For this reason the cam 61, or more properly speaking, the notch 62 thereof, is disposed directly beneath the gage pin 63 and hence it will be seen that when the drum is rotated by the thread movement, said pin 63 will be gradually raised while at the same time the cam 66 will, by virtue of the detent 71 in engagement with the notch at 10,500 index mark on the second dial, be rotated under the pin 81 until the notch 73 of said cam will permit the same to drop, and consequently allow the spring plunger 82 to rock the cutter carrying spindle 78 to bring the blade 77 into contact with the stationary plate 75, this action naturally occurring after the secondary dial has been rotated for a distance equal to 105 notches thereof, at which time the extension 68, Fig. 8 with the detent 71, will be perpendicularly disposed and in alinement with the zero mark on the stationary dial it being understood, of course, that the cutter pin 81 is in vertical alinement with said mark and, furthermore, that the notch 73 is in alinement with the center line of the extension 68.

In the operation of the device just above described, the movement of the index pointer 41 can, as far as the operator is concerned, be left entirely out of consideration, inasmuch as the device is used only for the purpose of cutting off the thread so soon as the required 10,500 yards of thread have passed over the drum. It will also be understood that by the mechanism above explained, and especially in view of the secondary dial 60 and its graduations, the operator is enabled to set the device so as to cut off the thread after any other desired number of yards of thread shall have been reeled off.

If the device is to be set, for instance, to cut the thread after 5,000 yards shall have passed over the drum, the operator would merely have to release the detent 71 from the secondary dial, then swing the extension 68 around (without, however, disturbing the secondary dial) until the detent 71 will come into alinement with the 5,000-mark on the secondary dial; by now moving said detent toward the center, the notch of the cut off cam will be brought into proper position to allow the pin 81 to drop after the 5,000 yards have been reeled.

It should be emphasized that the particular object or purpose of the gage pin 63 is to serve as an abutment for stopping the rearward setting movement of the secondary dial when the operator sets the device to the point of beginning operations, this construction permitting the operator to perform his duty by the sense of feeling rather than seeing, so that no possible mistake can occur, and the measuring device will be sure to start at the zero mark.

It is sometimes desirable to ascertain the capacity of different spools which vary in diameter as well as in length; and in order to provide a mechanism whereby the length of thread capable of being contained on a spool of any given size may be accurately determined, I deem it advantageous to use the index pointer 41 which, as above stated, travels over the index marks on the stationary dial 42 and one complete revolution of which records 100 yards of thread passing over the drum.

Now inasmuch as under these circumstances the cutting mechanism is not to be used, while on the other hand the movement of the secondary dial may be utilized to indicate notch by notch each 100 yards of thread passing over the drum and as recorded by each complete revolution of the index pointer 41, the cutter-actuating cam may be left out of consideration, and, therefore, entirely disconnected from the operating mechanism, a feature which may be readily accomplished by disengaging the detent 71 from the secondary dial plate 60. In that case it will, of course, be evident that the cutting cam will remain stationary, particularly in view of the fact that the spring-pressed plunger 82 above described will drive the pin 81 with sufficient pressure against the surface of the cam 66 to prevent inadvertent rotation thereof.

The operator can, therefore, by the aid of the pointer 41, determine each yard of thread as it passes over the drum, each hundred yard length being indicated by one full revolution of the pointer 41 over the stationary dial; and again, the secondary dial will move for the distance of one notch of its periphery for each complete revolution of the pointer 41.

In order to facilitate the reading of the movement of the secondary dial with some amount of accuracy, I have provided an index pointer designated in a general way by 100 and comprising a plate 101, (see Figs. 9 and 10) which has a projecting lip 102 adapted to be positioned adjacent the front edge of the secondary dial and in close proximity to the graduations thereof, or may be readily withdrawn therefrom.

In order to permit the withdrawal of the lip 102 so as not to interfere with the revolution of the detent 71 when the device is used for cutting off the thread, the plate 101 is slotted at 103 to receive a thumb screw 104 whereby the plate may be removably secured in position on the casing.

In Figs. 1 to 7 the finger plate 101 is shown in its retracted position; while in Figs. 9 and 10, said plate is shown coöperative with the front face of the secondary dial 60.

Means are provided for arresting the movements of the thread drum by a lessening of the tension of the thread as it is drawn therefrom, this decrease of tension being due either to slack or to the complete severance of the thread, whether intentional or accidental.

In the present instance the thread T passes through an eye or loop 105 which constitutes a part of a light-weight arm 106 rigidly secured on a brake shoe 107 which is pivoted at 108 to the casing and adapted to engage with the inner face 109 of the drum flange 22, above mentioned, it being evident that when the arm 106 falls, the surface 107' of the brake shoe 107 will be carried into contact with the flange in a manner clearly illustrated in Fig. 3, so that a wedging action of considerable force will take place immediately and therefore bring the drum to an instantaneous stop and thus arrest the movement of the entire mechanism.

Inasmuch as the mechanisms of my improved measuring and indicating device comprise a number of elements which, in themselves, should be kept free from dirt and at the same time remain practically under constant lubrication, the casing 25 is preferably formed in the shape of a well adapted to receive a quantity of oil o, Figs. 5, 6 and 7, which may be introduced into the casing through an aperture 110 and a side pocket 111 of the casing 25.

The oil is taken up from the well by the worm gear 28, and also by the worm 29, and gradually transmitted to the other movable elements of the mechanism, and inasmuch as it is essential to prevent the oil from escaping from the casing and being thrown around by centrifugal force, I provide the hub of the drum with the check ring or flange 115, see Fig. 6, so that the oil creeping through the bearings 24 will be thrown off at that point and into a groove 116 provided in the casing, for conducting such oil back into the well.

The device as a whole may be supported and positioned relatively to the spool in any convenient manner, and I have shown in the drawings the case 25 provided with an ear 120 for receiving a post 121, which may be carried by the spooling frame and to which the casing may be clamped by a set screw 121', as will be readily understood.

By referring to Fig. 6, it will be seen that the drum shaft 23 projects beyond the casing at both of its ends, so that in this way I am enabled to operate and place the thread-drum onto either end of said shaft, thus making the device either right or left hand, as required, and without necessitating any changes whatsoever in the interior of the casing.

Inasmuch as the cutting off device, or more particularly the blade 77 thereof, should be substantially in alinement with the thread measuring portion of the drum, it would under those conditions be necessary to reverse the position of the cutter-supporting bracket, or to supply a new one on the other side of the casing.

The operation of my improved device is as follows:—It being desired that the device shall cut off the thread after 10,500 yards have been reeled off, the operator will bring the detent 71 into alinement with the notch corresponding to the 10,500 mark on the secondary dial; this dial can now be turned around by hand in the direction of arrow $a$, see Fig. 4, until the gage pin 63 has dropped, and the dial may then be turned backward until it is stopped by said pin, in which position the 14,000 or 0 mark of the secondary dial is in exact alinement with the 0-mark of the stationary dial, or in other words: at the starting point.

It will be noticed that the distance to be traversed during the movement of the secondary dial when the latter is operated by the thread drum, will continue until the notch of the cam carried and controlled by the detent 71, will be directly under the cutter pin 81; or, in other words 105 notches will pass before said pin will be permitted to drop and thus allow the cutter spindle to cut off the thread, at which time 10,500 yards will have been measured off, and the same operation may now be repeated *ad infinitum*.

In detail, the operation of counting and cutting the next 10,500 yards of thread, is as follows: The thread to be measured is wound around the drum groove 20, the circumference of which is, as before stated, equal to one-fourth of a yard. Through the intervention of the worm 27 and worm gear 35, the vertical spindle 36 is rotated at a slow rate of speed which is still further reduced by the worm and gear drive 39, 40, to drive the index pointer 41, which latter will make one complete revolution for each four hundred rotations of the drum 20, so that this complete revolution of the pointer indicates the passage of 100 yards of thread, on the stationary dial 42 which is graduated into 100 divisions so that, therefore, each yard of thread as it is reeled off, can be readily determined. The rotation of the drum spindle 23 results also in driving the secondary dial 60 at a very much reduced ratio, by virtue of the worm and gear 27, 28, then the worm and gear 29, 30, and then the worm and gear 32, 33, which latter is in frictional connection with the dial 60 and drives the latter at the ratio of one complete rotation for each complete 56000 quarter-yard rotations of the drum 20, so that, consequently, each complete rotation of the secondary dial indicates the passage of 14,000 yards of thread over the drum 20. The periphery of the secondary dial is, as above stated, divided into 140 equal division-notches, so that each notch represents in reality the travel of 100 yards of thread; and inasmuch as a complete revolution of the pointer 41 denotes a like amount, it follows that for each complete revolution of the pointer 41 the secondary dial progresses one notch in the direction of arrow *a* Fig. 4. Now the cutter-cam is directly attached to the secondary dial so as to be rotated therewith (by virtue of the detent 71), and, inasmuch as the drop-notch 73 of the cam is in alinement with the detent 71, it follows that, according to Fig. 4, the secondary dial can travel in the direction of arrow *a* for a peripheral distance of 105 notches before the cam-notch 73 will come to a position under the plunger 81 whereby the cutter blade is held-up in its inoperative position, and which will then immediately drop and cut the thread, at which time 10,500 yards of thread will have been reeled off.

On the other hand it will be understood that when the pointer 41 and secondary dial 60 are in the position shown in Fig. 4, the machine may be set to cut the thread after any desired multiple of 100 yards have been reeled over the drum, by simply bringing the detent 71 into engagement with the correspondingly indexed notch of the secondary dial.

I claim:—

1. The combination, with a rotatable member operable by the material to be measured, of a cutter mechanism comprising a rock shaft, a blade carried by the rock-shaft, a plate coöperative with the blade, and a cam plate for controlling the operation of the rock shaft by the movement of said rotatable member.

2. The combination, with a rotatable member operable by the material to be measured, of a cutter mechanism, a dial controlled by the movement of the rotatable member, a disk controlling the operation of the cutter mechanism, and means for locking the disk to said dial.

3. The combination, with a rotatable member operable by the material to be measured, of a cutter mechanism, a dial controlled by the movement of said rotatable member, a disk controlling the operation of the cutter mechanism, and a detent carried by said disk for locking the disk to the dial.

4. The combination, with a rotatable member operable by the material to be measured, of a cutter mechanism, a graduated dial having notches and controlled by the movement of said rotatable member, a disk controlling the operation of the cutter mechanism, and means for locking the disk to the dial as determined by the graduations and the corresponding notches thereon.

5. The combination, with a drum, a pointer operated thereby, and a stationary dial coöperative with said pointer, of a secondary dial movable on the stationary dial, and frictional means controlled by the movement of the drum for moving said secondary dial at a predetermined ratio relative to the movement of said pointer.

6. The combination, with a drum, a pointer operated thereby and a stationary dial coöperative with said pointer and having graduations each of which indicates a single measure-unit of material passing over the drum, of a secondary dial movable on said stationary dial and having graduations each of which indicates one complete revolution of the pointer over the primary dial, and frictional means for operating said secondary dial from said drum.

7. The combination, with a drum rotatable by the material to be measured, of a cutter mechanism comprising a stationary plate and a movable blade, resilient means for normally throwing the blade toward the stationary plate, a rotatable spindle, a cam on said spindle for releasing said blade from the stationary plate, and means for frictionally driving said spindle from said drum.

8. The combination, with a drum rotatable by the material to be measured, and a cam plate controlled by the movement of said drum, of a cutter mechanism comprising a rockshaft, a blade carried by said rockshaft, a stationary plate coöperative with the blade for severing the material, and a movable pin interposed between the rockshaft and said cam plate for withdrawing the blade from the stationary plate.

9. The combination, with a rotatable drum operable by the material to be measured, and a disk having a notch and controlled by the movement of said drum, of a cutter mechanism comprising a stationary plate, a rock shaft, a movable blade held thereon, means for normally throwing said blade against said stationary plate, and a pin interposed between said rock shaft and said disk and adapted to enter said notch at a predetermined point of the movement of the disk for permitting the movable cutter blade to contact with said stationary plate.

10. The combination, with a rotatable drum operable by the material to be measured, of a cutter mechanism, a dial, means for frictionally rotating said dial by said drum, a disk for controlling the operation of the cutter mechanism and movable relatively to the dial, and means for locking said dial and disk together.

11. The combination, with a rotatable drum operable by the material to be measured, of a cutter mechanism, a dial having notches, means for frictionally rotating said dial by said drum, a disk for controlling the operation of the cutter mechanism and movable relatively to the dial, and a detent carried by said disk and adapted to enter one of said notches for locking the disk and dial together.

12. The combination, with a rotatable drum operable by the material to be measured, of a cutter mechanism, a cam plate for controlling the operation of the cutter mechanism, a gage disk, means for frictionally driving said gage disk by the movement of the drum, means for locking said disk and the cam plate together, and means for engaging said gage disk to position the same and the cam plate at the starting point of their movement so as to release the cutter mechanism at the completion of a predetermined number or rotations of said rotatable drum.

13. The combination, with a rotatable drum operable by the material to be measured, of a cutter mechanism, a cam plate for controlling the operation of the cutter mechanism, a gage disk having a notch, means for frictionally driving said gage disk by the movement of said drum, means for locking said cam plate to the gage disk, and a gravitative gage pin adapted to enter said notch for positioning said gage disk and the cam plate at the starting point of their movement to release the cutter mechanism at the completion of a predetermined number of rotations of said drum.

14. The combination, with a rotatable drum operable by the material to be measured, of a cutter mechanism, a cam plate for controlling the operation of said cutter mechanism, a gage disk having a notch, means for frictionally driving said gage disk by the movement of said drum, means for positioning said cam plate relatively to the disk, means for locking said disk and cam plate together, a gravitative gage pin adapted to enter said notch for positioning the gage disk and the cam plate at the starting point of their movement to release the cutter mechanism at the completion of a predetermined number of rotations of said drum.

15. The combination, with a rotatable drum operable by the material to be measured, of a cutter mechanism, a dial, means for frictionally moving said dial by said drum, a cam plate controlling the operation of the cutter mechanism, and a detent carried by said cam plate for locking the cam plate to the dial.

16. The combination, with a rotatable drum operable by the material to be measured, of a cutter mechanism, a graduated dial having peripheral notches, means for frictionally rotating said dial, a cam plate controlling the operation of the cutter mechanism, and a detent carried by said cam plate and adapted to engage any one of the notches of said dial for locking said cam plate and dial together.

17. The combination, with a casing, a shaft supported for rotation therein, and a drum adapted to be mounted on either end of said shaft, of a stationary primary dial supported by said casing, an index shaft having a pointer and mounted for rotation in said casing, means for frictionally operating said index shaft, a secondary dial mounted for rotation in the casing, an index pointer on said casing and coöperative with said secondary dial, and means for frictionally operating said secondary dial.

18. The combination, with a casing, a drum mounted for rotation thereon, a cutter mechanism supported on said casing, and intermediate gearing comprising a rotatable cam-plate actuated by said drum for said cutter mechanism inoperative during a predetermined number of rotations of said drum, of a brake mechanism adapted to engage said drum, and a guide for directing the movement of the material relative to the drum and for controlling the operation of the brake mechanism.

19. The combination, with a casing, a drum mounted for rotation thereon, a cutter mechanism supported on said casing, and intermediate gearing comprising a rotatable cam-plate for maintaining such cutter mechanism inoperative during a predetermined number of rotations of said drum, of a brake shoe pivotally supported on the casing, a material-guide connected with said brake shoe and adapted to cause said brake shoe to engage said drum upon a decrease in tension of the material.

Signed by me at Springfield, Mass., in presence of two subscribing witnesses.

HENRY J. MARX.

Witnesses:
WM. S. BELLOWS,
G. R. DRISCOLL.